June 1, 1926.

J. DUGDILL 1,586,979

MOVABLE SUPPORT FOR ELECTRIC LIGHTS, GAS, AND OTHER PURPOSES

Filed Feb. 21, 1923    2 Sheets-Sheet 1

INVENTOR:
John Dugdill
BY Wm. Wallace White
ATT'Y.

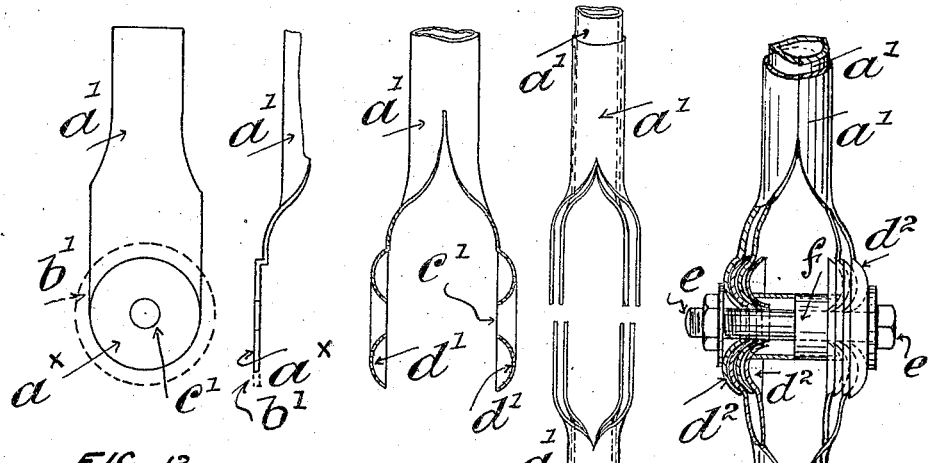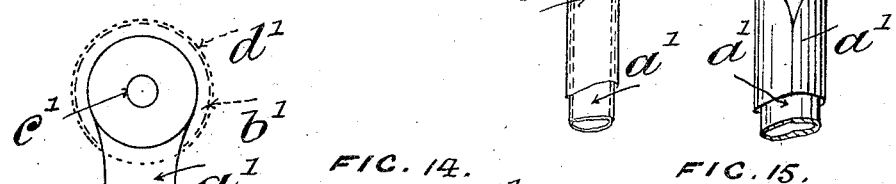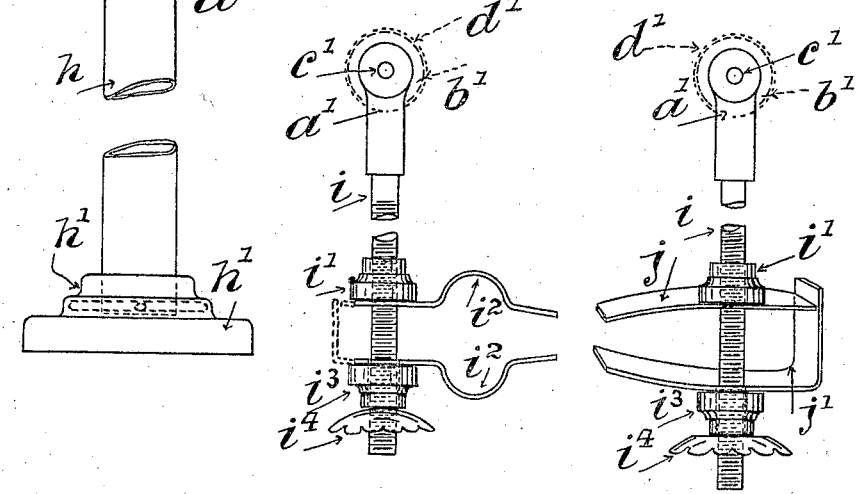

Patented June 1, 1926.

1,586,979

UNITED STATES PATENT OFFICE.

JOHN DUGDILL, OF HAZEL GROVE, NEAR STOCKPORT, ENGLAND.

MOVABLE SUPPORT FOR ELECTRIC LIGHTS, GAS, AND OTHER PURPOSES.

Application filed February 21, 1923, Serial No. 620,549, and in Great Britain May 12, 1922.

These improvements have reference to knuckle or fork-jointed fittings for supporting or carrying electric or gas or other lights and for receiving and substantially encasing the wire or gas conducting tubing, said improvements relating generally to the type of fitting which is in the nature of a movable and self-sustaining support. The improved supports have other uses not necessary to be particularized.

My object is to improve the efficiency of such knuckle or fork-jointed fittings whereby joints are obtained in which the working faces are expanded and dished or curved resulting in the obtainment of peripheral contacting surfaces of considerable area producing something approximating to a kind of ball joint in respect of jointed fittings which move relatively in a single plane only. I make the contacting surfaces concave and so as to nest together, the contact surfaces being produced on sheet metal elements or upon two fork-like strips produced from a slitted tube end, the concave ends socketing as it were together and being bored in manner to produce registering apertures, a distance sleeve being introduced and a bolt to form a pivot about which the fork elements articulate.

The production of concavities upon the fork extremities gets rid of the difficulty of making the outer margins or extremities of flat contacting fork elements meet when the pivoted bolt exercises its function in jointed fork structures of the already known type.

My improvements include the use of knuckle jointed or forked fittings consisting of more than two fork elements on either hand having coinciding concavities, that is, laminated fork elements having combining and consecutively registering concavities.

My improvements include other detail features not necessary to specify in this preamble.

The invention will be further explained in the detailed description which follows, reference being had to the attached drawings, wherein:—

Figures 7, 7A:
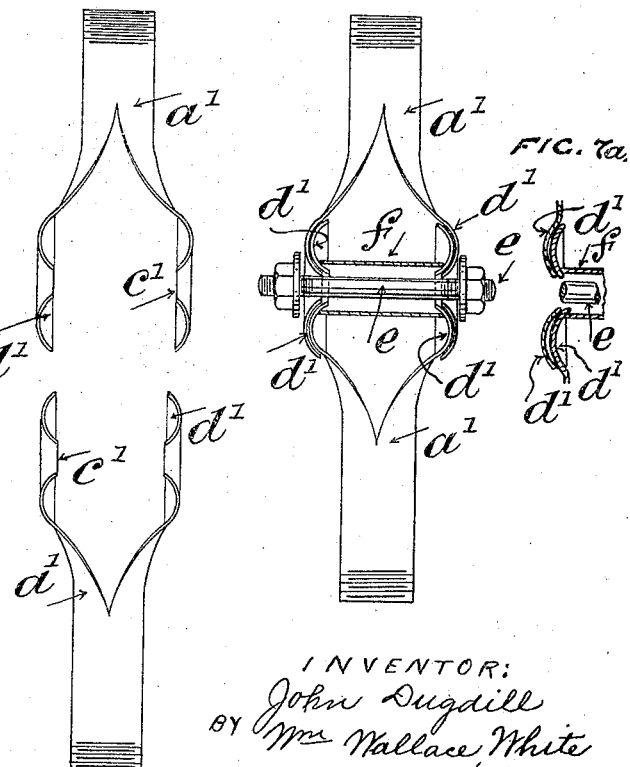
Fig. 7 is a view showing the assembly of the elements shown in Fig. 6 and the use of the spacing sleeve and bolt.

Fig. 7$^a$ is a detail modification.

Fig. 8 indicates, in side view, a flattening and enlarging of a limb element either sheet or tube.

Fig. 9 is an edge view of Fig. 8.

Fig. 10 shows the concavities developed on the fork elements.

Fig. 11 indicates concentric tubes with two fork elements to each of the two tubes to be hinged or pivoted, the two tubes being socketed one within the other, the fork elements being in the flat form prior to dishing to produce the desired concavities.

Fig. 12 shows the development of this form, wherein the concavities are shown socketing or alternating to produce as it were a laminated joint of dished elements having concavities and springing alternately first from one tube and then the other.

Fig. 13 is a view showing a swivelling tubular holder, movable in a base piece, the tubular holder having its end punched, enlarged and ready to be dished to produce the concavity.

Fig. 14 shows a tubular support having its forked extremities as before indicated and with means for fixing the support.

Fig. 15 is a view of a construction similar to Fig. 14 but with a modified means of fixing.

Figure 1:
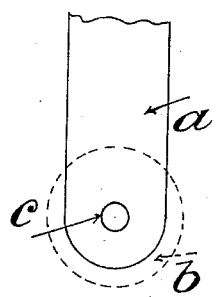
Fig. 1 shows a metallic strip suitable for forming the limb or one element of a fork, the strip being bored and enlarged as to its extremity as indicated by dotted lines.
Figure 2:
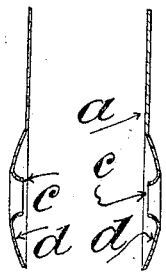
Fig. 2 is a sectional view of two fork elements having the enlarged portion shaped to produce an annular dishing or concavity.

In carrying out my invention, and for producing fittings of the type set forth, I make use of fork elements. These forks may be made from sheet metal or strips such as $a$, Fig. 1, and the ends are flatted or enlarged as indicated by the dotted circle $b$. The metal strips or limbs are punched to produce holes $c$ and the flattened part is dished or pressed to obtain the concavity $d$ indicated, the holes being tooled or pressed in for preference to produce inwardly directed paps as shown. The assembly of the dished limbs or forks to produce a joint is clear from Fig. 3.

Figures 3, 4:
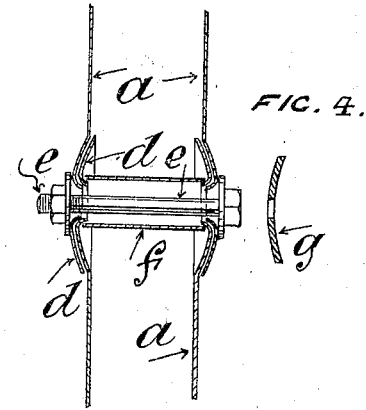
Fig. 3 shows, in sectional view, two sets of fork elements assembled with the concavities in proper register and with the spacing sleeve and bolt in position and the joint made good.
Fig. 4 shows separately a concave washer which may be used with the bolt.
Figure 5:
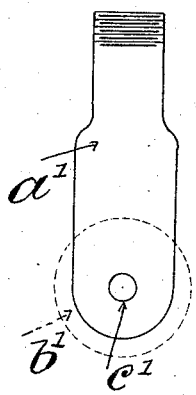
Fig. 5 shows a development of my invention in which the fork elements or limbs are produced by slitting, shaping and expanding or working a tube end.
Figure 6:
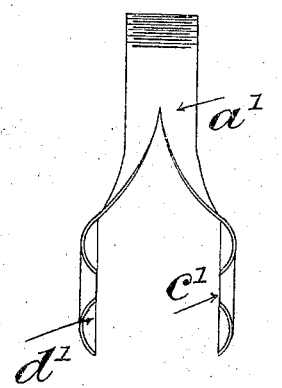
Fig. 6 shows the tube ends prepared, the limbs being punched and shaped to produce the concavities which socket or engage together on assembly of the two elements.

I may slit and flatten out the ends of tubes such as marked $a'$ in Figs. 5 to 7, the flattened out and enlarged portions $b'$ being dished to produce the concavities $d'$ and the holes $c'$ being tooled or pressed to produce inwardly directed paps. I may form the inner concavity slightly flatter than the outer concavity to accentuate pressure or contact at the edges with respect to the nesting concavities as is indicated at Fig. 7$^a$. The sets of fork elements are socketed together to produce the peripheral or concave joints, as indicated by Figs. 3 and 7, and the forks are hinged the one to the other due to socketing of the concavities and by using a spacing sleeve $f$ and a bolt $e$ passing through the paps and the spacing sleeve. The spacing sleeve keeps the fork elements from closing under pressure from the screwing-up of the nuts on the bolt, in the known manner.

For electrical purposes I lead the flexible wires through the tubes and around the sleeves $f$ while for gas conveying purposes I lead the flexible tube through the forked tubes and if necessary around the sleeve in the usual manner.

It will be clearly understood, where the forks are made out of a tube that after slitting and flattening or pressing the two halves of the tube to their normal width, I expand the flats so obtained as much as possible to obtain a wider contact surface. To get over the difficulty of having to make the outer margins of the flats meet and rub together when pressed by the pivotal bolt (which is not an easy matter) I as stated make the opposing faces of the flats dished or concave which operation develops the resiliency of the contacting areas which is highly desirable ensuring efficient and easy working contact between the friction faces.

Improved marginal contact may be obtained by using concave washers in lieu of flat washers under the bolt head or nuts, and such a concave washer is shown at Fig. 4 and marked $g$. If such a concave washer is used, the intermediate dished limb element is supported between the concave surfaces.

Forked joints formed on the improved principle set forth give a smooth, firm and regular friction quality facilitating easy and steady movement and ensuring long life.

As will be appreciated it is a matter of no moment whether the forks be made from tube lengths or separately produced and applied to tubular or other hinged or jointed fittings. The Figs. 8, 9 and 10 indicate a flattening of the fork element at $a^x$ prior to enlargement and dishing to produce the concavity.

Where extra joint friction is required, I concentrically duplicate the tube ends by inserting one tube within another, each tube being formed with a pair of forks. Fig. 11 suggests the concentric disposition of the tubes.

The extremities of the forks are pressed or expanded and dished to produce concavities marked $d^2$. Where two sets of tube elements with prepared concavities are pivoted together, the fork elements alternate and socket together thus producing a form of laminated fork structure and doubling the friction surfaces with practically no increase of compass. Obviously fork limbs may be produced separately and have their extremities expanded and shaped and dished to produce concavities, and, in such case, the fork elements would alternate to give a laminated form of hinged joint similar in all essential respects to what is before mentioned. In all these examples of laminated concave ended forks I should punch paps in the limbs and use a spacing sleeve $f$ and bolt $e$ with washers and pressure nuts.

In Fig. 13, an upright tube $h$ is indicated, held in a socket $h'$, and this tube is slit and has its fork like extremities $a'$ flattened and expanded and thereafter dished or shaped to produce concavities $d'$, such figure being introduced to show my idea applied to a supporting upright to which any structure for jointing can be applied the tube being capable of rotation in the supporting base or socket $h'$.

If the improved fittings are to be applied to a shelf, ledge, or rail, I may form an extra long thread on the tubular portion $i$ and have a nut $i'$ and two resilient clips $i^2$ on the tubular portion designed to grip a ledge, adjustment of the clips being effected by a sliding collar $i^3$ backed up by a screwed nose like $i^4$. If it is desired to ensure parallel movement of two clamping clips, such as are marked $j$, $j'$, in Fig. 15, I may have an extension from one of the clips marked $j'$ and bend same at right-angles to the other clamping clip $j$, the extremity of the latter butting against the right angled portion of the other thus compelling parallel movement when any adjustment is made. Such an arrangement is clearly shown by Fig. 15, as also is the enlargement of the forked end at $a'$ and the dishing or pressing to produce a concavity $d'$ which features are of the essence of the invention.

The improved joints are specially applicable to the various well known forms of movable shelf or wall brackets, bench standards, ceiling pendants, portable and other fittings in which ordinary knuckle or fork joints have been used.

I declare that what I claim is:

A knuckle-jointed structure comprising two tube elements circular in cross-section, each tube being shaped and slit to produce forks having round ears, said ears being expanded or enlarged, the enlarged ends being dished to produce concavities, the dished ends socketing and nesting together and producing enlarged spherical areas contacting over the entire faces, the nesting dished spherical extremities being separated by an interposed sleeve and articulating upon a bolt with nuts and washers, all in combination and for the purposes related.

In testimony whereof I have signed my name to this specification.

JOHN DUGDILL.